Oct. 22, 1929.   D. A. RIPLEY   1,732,773

METHOD OF AND APPARATUS FOR FEEDING MOLTEN GLASS

Filed Feb. 20, 1920

WITNESSES
J. Herbert Bradley.

INVENTOR
Daniel A. Ripley,
by Christy & Christy
Attys.

Patented Oct. 22, 1929

1,732,773

UNITED STATES PATENT OFFICE

DANIEL A. RIPLEY, OF ASPINWALL, PENNSYLVANIA, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed February 20, 1920. Serial No. 360,245.

It is the object of the invention to provide apparatus for receiving molten glass flowing from a tank furnace or like receptacle, and delivering such glass in successive increments, and in regulated quantities, to shaping mechanism, such as a succession of molds.

The apparatus of the present invention is in itself not only extremely simple, and capable of very accurate and economical operation, but in its preferred form it supplies a want which, so far as known to me, has not yet been satisfied in other commercial forms of apparatus heretofore employed for the same general purpose, in that means are here provided for accomplishing the delivery to successive molds of successive different quantities of glass, the quantity in each delivery being accurately predetermined.

In present large-scale commercial operation of highly perfected machines for the manufacture of glass articles such as tumblers, jars, etc., it often happens that a manufacturer is in receipt of an order for a certain size of a given article, which while in considerable amount, will hardly justify the changing or use of all the molds on one machine, since the rapidity of production is so high, and this condition will also obtain with respect to several different sizes of the same article, or even different articles the molds for which can be mounted on the same table. The apparatus of the present invention is so constructed as to adequately meet this situation.

Figure 1:
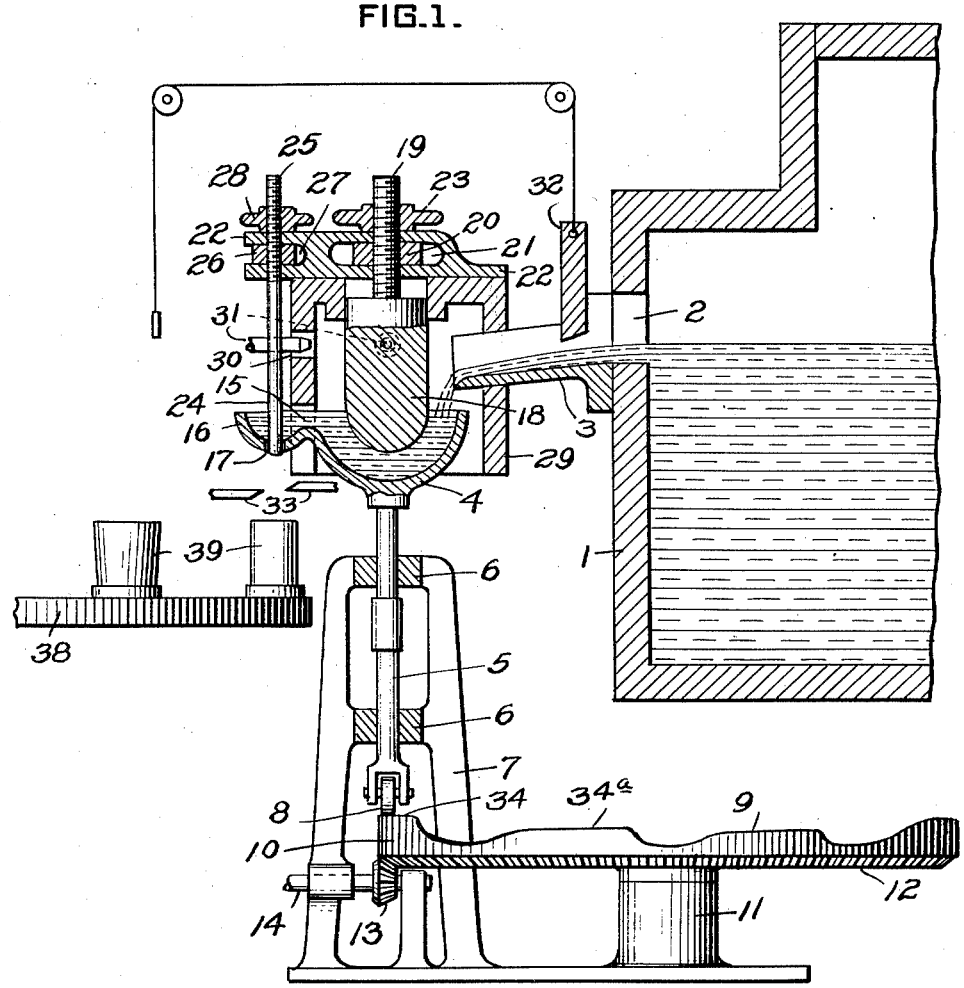
Figure 2:

In the accompanying drawings, Figure 1 is a sectional elevation of apparatus embodying the invention in its preferred form, arranged at the delivery end of a tank furnace; and Figure 2 is a conventional lineal development of a circular cam-track for controlling the operation of the apparatus.

The tank furnace 1 has a discharge outlet 2 opening sufficiently below the normal level of the glass in the tank to permit the continuous flow of molten glass through the outlet 2, and by way of the spout 3 into the bowl 4, the latter being so arranged beneath the discharge end of the spout as to receive the stream of glass at one side near its edge. The bowl 4 is mounted on the upper end of a vertically reciprocating rod 5, which is guided in openings formed in the cross-bars 6, 6 of a standard 7, and which is provided at its lower end with a roller 8. The roller 8 bears upon a circular cam-track 9 formed upon the upper peripheral face of a horizontally arranged cam-wheel 10, rotatably mounted on a standard 11. A bevel-gear 12 is formed on the under face of the wheel 10 and meshes with a suitable bevel pinion 13 on the horizontal driving-shaft 14. The shaft 14 is connected to a suitable source of power, not shown. It will thus be seen that the rotation of the driving-shaft 14 will cause vertical reciprocation of the rod 5 and bowl 4, the frequency and extent of such movement in each case being determined and controlled by the contour of the cam-track 9 on the upper periphery of the wheel 10.

In the upper edge of the wall of the bowl 4, and preferably diametrically opposite the point where it receives the stream of molten glass from the spout 3, there is formed an outlet 15, which opens into a supplemental bowl 16, which is caused to reciprocate vertically with the bowl 4, and is preferably formed integral therewith. In the bottom of the bowl 16 there is formed an outlet 17, through which the molten glass is intended to flow to a mold or other glass-shaping appliance, there being shown in Figure 1, but only conventionally, a portion of a mold-table 38 carrying a series of molds 39 successively into line beneath the discharge outlet 17.

For expelling or causing the molten glass to flow from the primary receiving-bowl 4 through the outlet 15 into the supplemental discharging-bowl 16, the bowl 4 is provided with a displacement member adapted to expel a portion of the molten glass in said bowl 4 each time that the bowl is lifted. In the embodiment of the invention herein shown and described this displacement member is a stationary plunger 18 mounted concentrically above the bowl 4, so as to enter the bowl and thereby displace a portion of its molten content when the bowl is lifted. The plunger 18 is preferably made of refractory material, and is vertically adjustable. To the latter end it is shown as carried by a threaded metal shank 19 having an adjusting nut 20 held against vertical movement in an orifice 21 in an overhanging fixed bracket or support 22. Thus by turning the nut 20, the shank 19 and the depending plunger 18 may be moved up or down. The shank 19 is shown as also provided with a lock-nut 23 bearing upon the upper face of the bracket 22.

For closing the outlet 17 from the discharge-bowl 16 when said bowl is lifted, and allowing it to open when lowered, there is provided a second fixed plunger or stopper 24 of proper size, also preferably of refractory material, which is adjustably mounted in the bracket 22 in the same way as is the plunger 18. That is to say, the plunger 24 has a threaded shank 25 in engagement with an adjusting nut 26, held against vertical movement in the orifice 27 in said bracket 22, and there is provided for it the upper lock-nut 28.

An open-bottom hood 29 of refractory material depends from the bracket 22 and surrounds the bowl 4. This hood 29 is provided with ports 30 into which project burners 31, so that the molten glass in the bowl 4 is maintained at all times at a substantially uniform temperature.

In Figure 1 I have shown conventionally a vertically movable gate 32 for the trough 3. Many varieties of such gates are well known.

I have also in like manner indicated a pair of coacting blades 33 for cutting off each increment of glass discharged from the bowl 16. This cutter will preferably be so connected with the rod 5, or other moving element of the apparatus, as to be operated automatically at the proper time. Many forms of such connection which will be suitable are well known to those skilled in the art, and since the automatic cutter is not an element of the present invention, detailed description is unnecessary.

The operation of the apparatus will be apparent from the foregoing description. It is intended that a stream of molten glass shall flow continuously from the tank furnace through the spout 3 into the receiving-bowl 4, in which a pool of glass will be maintained exposed to the heat generated by the burners 31 within the hood 29. When the bowls are lifted, the discharge-outlet in the bowl 16 is closed by the lower end of the fixed plunger 24, and the fixed plunger 18 is caused to enter the pool of glass in the bowl 4 to an extent predetermined by the height of the elevating cam-surface 34 on the cam-track 9, thus displacing and expelling through the outlet 15 into the bowl 16 a predetermined quantity of molten glass. When the bowls are lowered the displacing action of the plunger 18 ceases, while the outlet 17 is opened and the increment of molten glass in the bowl 16 is discharged into the mold beneath, (the cutter 33 being then automatically operated if desired).

By the use of an endless series of controllers which are caused to operate in succession, as in the case of the undulations of the cam-track 9, it is possible by forming the elevated portions 34, 34ª, etc. on said cam-track of varying predetermined heights, to cause the discharge at successive strokes of the apparatus of predetermined different quantities of glass and in any predetermined order. By adjusting the plungers 18 and 24 vertically, all of the different masses of glass discharged while the roller 8 is traversing the cam track may be altered to substantially the same extent, it of course being understood that the stream from the spout 3 will be adjusted if required to assure an adequate supply of glass in the bowl 4 for the continued operation of the apparatus with the plungers in any given vertical adjustment. Thus by arranging different molds in corresponding order on the table 38, the proper quantity of glass will be automatically supplied to each mold.

While I have herein described the preferred embodiment of my invention, it will be evident that the apparatus may be widely varied by those skilled in the art without material departure from its spirit and scope.

I claim as my invention:

1. In a machine for feeding molten glass, the combination of a primary container adapted to receive the molten glass and provided with an outlet, a displacement member adapted to co-operate with said primary container to cause the flow of glass from said primary container through said outlet, a secondary container in position to receive the glass from the primary container and provided with an outlet for the discharge of the glass by gravity, a closure for said gravity outlet, and means for operating said parts to first close said gravity outlet and cause the flow of glass from the primary container into the secondary container, and then to discontinue said flow and open said gravity outlet.

2. In a machine for feeding molten glass, the combination of a primary container adapted to contain a pool of molten glass, an adjustable displacement member adapted to co-operate with said primary container to expel a predetermined quantity of glass from said primary container, a secondary container in position to receive the glass from the primary container and provided with an outlet for the discharge of the glass by gravity, a closure for said gravity outlet, and means for operating said parts to first close said gravity outlet and expel a predetermined charge of glass from the primary container into the secondary container, and then to open said gravity outlet.

3. In a machine for feeding molten glass, the combination with a container adapted to contain a pool of molten glass, a displacement member adapted to co-operate with said container to expel successive quantities of glass therefrom, and means for operating said parts in successive strokes and for varying the amplitude of successive strokes for the successive expulsion from said container of different quantities of glass.

4. In a machine for feeding molten glass, the combination with a container adapted to contain a pool of molten glass, means for continuously supplying glass thereto, and a displacement member adapted to co-operate with said container to expel successive quantities of glass therefrom, of means for operating said parts in successive strokes and for varying in predetermined order the amplitude of successive strokes for the successive expulsion from said container of different predetermined quantities of glass.

5. In a machine for feeding molten glass, the combination with a container adapted to contain a pool of molten glass, means for continuously supplying glass thereto, and means for expelling from said container by displacement successive quantities of glass, of means for causing the operation of said displacement means and for varying in predetermined order the operation of said displacement means for the successive expulsion from said container of different predetermined quantities of glass.

6. The combination of a traveling mold carriage, molds thereon arranged to move successively past a charging position, a receptacle to contain molten glass, said receptacle having a discharge outlet, means for reciprocating said receptacle in timed relation to the movements of the molds, and means controlling discharge of glass through said outlet in response to the reciprocating movements of the receptacle to cause a periodic discharge of the glass into the molds.

7. The combination of a furnace to contain molten glass, a receptacle to receive the glass from the furnace, said receptacle having a discharge opening in the bottom thereof, means to reciprocate said receptacle vertically, and a stationary regulating device within said receptacle for regulating the discharge of glass.

8. The combination of a furnace to contain molten glass, a receptacle to receive the glass from the furnace, said receptacle having a discharge opening in the bottom thereof, means to reciprocate said receptacle vertically, a stationary regulating device within said receptacle for regulating the discharge of glass, a cutter operable to sever the glass at a point beneath said receptacle, and means to actuate the cutter in timed relation to the movements of the receptacle.

9. The combination of a furnace to contain molten glass, said furnace having an outlet opening in the side wall thereof through which the glass is discharged, a receptacle positioned to receive the glass as it is discharged from the furnace, means to reciprocate said receptacle vertically, said receptacle having a discharge opening in the bottom thereof, and a stationary regulating plug projecting downwardly within the glass in said receptacle over said opening.

10. The combination of a furnace to contain molten glass, said furnace having an outlet opening in the side wall thereof through which the glass is discharged, a receptacle positioned to receive the glass as it is discharged from the furnace, means to reciprocate said receptacle vertically, said receptacle having a discharge opening in the bottom thereof, a stationary regulating plug projecting downwardly within the glass in said receptacle over said opening, a cutter, and means to operate said cutter to sever the glass below said opening while the receptacle is in its upper position.

11. The method of producing charges of molten glass, which consists in maintaining a continuous supply of molten glass in a container having an outlet in the bottom thereof, periodically moving said bottom up and down, and periodically severing the glass beneath the outlet.

12. The combination of a container for molten glass, an implement controlling the discharge of successive masses of glass from the container by relative movements of the container and the implement, and automatic means for periodically varying said relative movements in a predetermined order and thereby periodically varying the relative sizes of the respective discharged masses.

13. The combination of a container for molten glass having an outlet orifice through which glass may issue, an implement extending into the container, means for periodically moving the container relatively to the implement to cause discharge of successive masses of glass through the outlet orifice, and means to automatically vary the successive movements of the container to thereby vary the size of the respective discharged masses.

14. The combination of a container for molten glass having a discharge orifice, a plunger controlling the flow of glass through said orifice, means to effect relative reciprocations of the plunger and the container, and automatic means to vary the successive reciprocations.

15. The method of feeding molten glass in mold charges, which comprises periodically discharging successive masses of the glass past a severing plane, periodically and automatically varying the sizes of said discharged masses, and severing a mold charge at the severing plane from each of said discharged masses.

16. The method of feeding molten glass, which comprises disposing a pool of molten glass adjacent to a delivery outlet, periodically causing successive impulses in said glass to discharge portions thereof through the outlet, and automatically varying said periodic impulses to vary the sizes of the respective discharged portions of glass.

17. The method of feeding molten glass, which comprises disposing a pool of molten glass adjacent to a delivery outlet, periodically causing successive impulses in said glass to discharge portions thereof through the outlet, automatically varying said periodic impulses to vary the sizes of the respective discharged portions of glass, and severing a mold charge from each discharged portion of glass while the latter is suspended from the outlet.

18. In a method for automatically and rapidly molding articles of glassware of a plurality of different sizes in the same machine, the steps of moving molds for receiving mold charges for the different articles of glassware successively in an invariable order to a mold charge receiving position, and synchronously measuring, cutting off and depositing in each mold a mold charge of the required amount of glass for the particular article of glassware that is to be formed in that mold.

19. The method of feeding charges or gathers of molten glass, comprising continuously feeding the molten glass in a regulated succession of mold charges or gathers, and automatically varying the weight of the said charges in a predetermined order.

20. The method of delivering gobs of glass to the molds of a forming machine, which consists in bodily moving a mass of molten glass vertically to and from a stationary member contacting with said mass on the side opposite to that on which the gobs are formed thereby reducing the flow of glass, severing the gobs from the said mass and causing them to enter the mold.

21. The method of delivering gobs of glass to the molds of a forming machine, which consists in confining a mass of molten glass and permitting a flow from the underside of said mass, bodily moving said mass vertically to and from a stationary member contacting with the mass opposite to said flow thereby reducing and increasing said flow, and then severing from the flow the gobs and causing them to enter the molds of the forming machine.

22. The method of delivering gobs of glass to the molds of a forming machine, which consists in vertically moving a mass of molten glass to and from a stationary member extending into said mass on the side opposite to that on which the gobs are formed whereby its flow is increased periodically, severing the gobs from the said mass and causing them to enter the mold.

23. An apparatus for feeding molten glass into molds comprising a receptacle having an outlet orifice, means for opening and closing said outlet, means for imparting a vertical movement to said receptacle, and severing means located adjacent said outlet orifice.

24. An apparatus for feeding molten glass into molds comprising a receptacle having an outlet orifice, adjustable means for opening and closing said outlet, means for imparting a vertical movement to said receptacle, severing means located adjacent said outlet, and means for feeding a regulated stream of molten glass to said receptacle.

25. An apparatus for feeding molten glass into molds comprising a receptacle having an outlet orifice, adjustable means extending into said receptacle for opening and closing said outlet, means for imparting a vertical movement to said receptacle whereby said outlet is opened and closed, severing means located adjacent said outlet, and means for feeding a regulated stream of molten glass into said receptacle.

26. An apparatus for feeding molten glass into molds comprising a receptacle having an outlet orifice, means extending into said receptacle for opening and closing said outlet, means for imparting vertical movement to said receptacle whereby the outlet is alternately opened and closed, guides for directing the direction of movement of said receptacle, and severing means located adjacent said outlet orifice.

27. In an apparatus for feeding molten glass into molds, a receptacle open at one end, said open end located adjacent the wall of a glass furnace, a discharge opening formed in the bottom of said receptacle, means for supplying a regulated stream of molten glass to said receptacle, means for imparting vertical reciprocation to said receptacle, and a stationary plunger having a blunt end extending into said receptacle and located directly above the discharge opening whereby on the reciprocation of the receptacle the flow of molten glass through said discharge orifice is increased and reduced above and below the normal rate of flow.

28. In an apparatus for feeding molten glass into molds comprising a receptacle open at one end and provided in its bottom with a discharge orifice, the open end of said receptacle located adjacent the wall of a glass furnace, means for supplying a regulated stream of molten glass to said receptacle from said furnace, means for imparting a bodily vertical reciprocation to said receptacle, and an adjustable stationary plunger having a blunt end extending into said receptacle and located directly above the discharge opening whereby on the reciprocation of the receptacle the flow of molten glass into said orifice will be increased and reduced.

29. In an apparatus for feeding molten glass into molds, a glass furnace having a discharge outlet in one wall thereof, a receptacle having a discharge outlet in its bottom mounted outside of said furnace and in front of said opening, means for feeding molten glass through said opening into said receptacle, guides for supporting said receptacle against horizontal or tipping movement, means for imparting a bodily vertical up and down movement to said receptacle, and an adjustable plunger extending into said receptacle directly above said discharge opening whereby the flow of glass is increased and retarded by the movement of said receptacle In testimony whereof I have hereunto set my hand.

DANIEL A. RIPLEY.